United States Patent
Makke et al.

(10) Patent No.: US 11,532,229 B2
(45) Date of Patent: Dec. 20, 2022

(54) VEHICLE AND NETWORK ASSISTED PARKING

(71) Applicant: FORD GLOBAL TECHNOLOGIES, LLC, Dearborn, MI (US)

(72) Inventors: Omar Makke, Lyon Township, MI (US); Oleg Yurievitch Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 135 days.

(21) Appl. No.: 17/029,792

(22) Filed: Sep. 23, 2020

(65) Prior Publication Data

US 2022/0092978 A1 Mar. 24, 2022

(51) Int. Cl.
| | |
|---|---|
| *G08G 1/14* | (2006.01) |
| *B60W 60/00* | (2020.01) |
| *G01C 21/34* | (2006.01) |
| *B60W 30/06* | (2006.01) |

(52) U.S. Cl.
CPC ............... *G08G 1/14* (2013.01); *B60W 30/06* (2013.01); *B60W 60/001* (2020.02); *G01C 21/3415* (2013.01); *G01C 21/3461* (2013.01); *B60W 2556/45* (2020.02)

(58) Field of Classification Search
CPC combination set(s) only.
See application file for complete search history.

(56) References Cited

U.S. PATENT DOCUMENTS

| | | | |
|---|---|---|---|
| 7,483,772 B2 | 1/2009 | Oesterling et al. | |
| 9,377,315 B2 | 6/2016 | Grover et al. | |
| 2017/0169712 A1* | 6/2017 | Penilla | G01C 21/3407 |
| 2017/0205824 A1 | 7/2017 | Nordbruch | |
| 2017/0302774 A1* | 10/2017 | Lei | H04M 1/72412 |

FOREIGN PATENT DOCUMENTS

| | | |
|---|---|---|
| WO | 2018093352 A1 | 5/2018 |
| WO | WO-2018093352 A1 * | 5/2018 |
| WO | 20180816 A1 | 8/2018 |

* cited by examiner

*Primary Examiner* — Vivek D Koppikar
*Assistant Examiner* — Jeffrey R Chalhoub
(74) *Attorney, Agent, or Firm* — Michael Spenner; Brooks Kushman P.C.

(57) ABSTRACT

A system communicates with a plurality of vehicles onsite at a parking garage. The system determines an eventual intended destination for each respective vehicle of the plurality of vehicles and determines a path through the garage for each respective vehicle, to the destination for the respective vehicle. The system may segment the path into a plurality of shorter tasks for the respective vehicle, wherein each task moves the respective vehicle along the path until a point where the respective vehicle encounters an obstruction and instruct the respective vehicle to execute the shorter tasks for the respective vehicle.

5 Claims, 6 Drawing Sheets

VEHICLE AND NETWORK ASSISTED PARKING

TECHNICAL FIELD

The illustrative embodiments generally relate to methods and apparatuses for vehicle and network assisted parking.

BACKGROUND

Connected services have become a commonplace part of the in-vehicle experience. From applications running onboard the vehicle, to cellular and wi-fi communication enabled by the vehicle, to satellite aided navigation systems, vehicle occupants have come to increasingly expect connectivity as a standard feature of the vehicle.

This connectivity has been leveraged to provide a number of cloud-based services to vehicles as well. Since offboard computing can be vastly more powerful than an onboard computer, and because cloud-based systems often have access to crowd-sourced and immediate data, many services execute in the cloud and/or rely on the cloud for some aspect of data and/or processing.

Thus, in areas such as parking structures, where cellular connections can degrade or cease due to signal blockage, many of these applications and processes that rely on communication can temporarily cease operation or lose aspects of operation. This does not commonly present a significant problem, as a user is typically intending to leave the vehicle soon after entering a parking garage, but as autonomous and semi-autonomous vehicles become more heavily reliant on communication, the ability of those vehicles to interact with the cloud and necessary remote services may be impacted, which in turn can have an impact on a vehicle's ability to self-drive or partially self-drive.

SUMMARY

In a first illustrative embodiment, a system includes a processor configured to communicate with a plurality of vehicles onsite at a parking garage. The processor is also configured to determine an eventual intended destination for each respective vehicle of the plurality of vehicles and determine a path through the garage for each respective vehicle, to the destination for the respective vehicle. The processor is further configured to segment the path into a plurality of shorter tasks for the respective vehicle, wherein each task moves the respective vehicle along the path until a point where the respective vehicle encounters an obstruction and instruct the respective vehicle to execute the shorter tasks for the respective vehicle.

In a second illustrative embodiment, a system includes a processor configured to determine that a first vehicle is connected to a wireless network for a parking garage. The processor is also configured to establish communication with the first vehicle over the network. The processor is further configured to determine a path for the first vehicle through the garage to a destination inside the garage and segment the path into a plurality of first instructions that instruct the first vehicle to move through the parking garage while accommodating other vehicles also instructed by the processor, such that a given instruction instructs the first vehicle to move along the path until it encounters another vehicle also instructed by the processor. Further, the processor is configured to instruct the first vehicle to execute the plurality of instructions and monitor the path for at least one new obstruction not accommodated by the first instructions. The processor is additionally configured to adjust the first instructions with second instructions to accommodate the new obstruction. The processor is also configured to re-instruct the first vehicle to execute the first instructions modified by the second instructions and continue to monitor, adjust and re-instruct until the first vehicle reaches the parking space.

In a third illustrative embodiment, a system includes a vehicle processor configured to request a reservation in a parking garage. The processor is also configured to, responsive to the request, receive reservation notification and credentials for connecting to a wireless network of the parking garage. Further, the processor is configured to determine that a vehicle, including the processor, is onsite at the parking garage and responsively connect to the wireless network using the credentials, and, responsive to connecting to the wireless network, authorize a parking-garage-associated processor to instruct control of the vehicle while the vehicle travels within the parking garage.

DETAILED DESCRIPTION

Figure 1A:
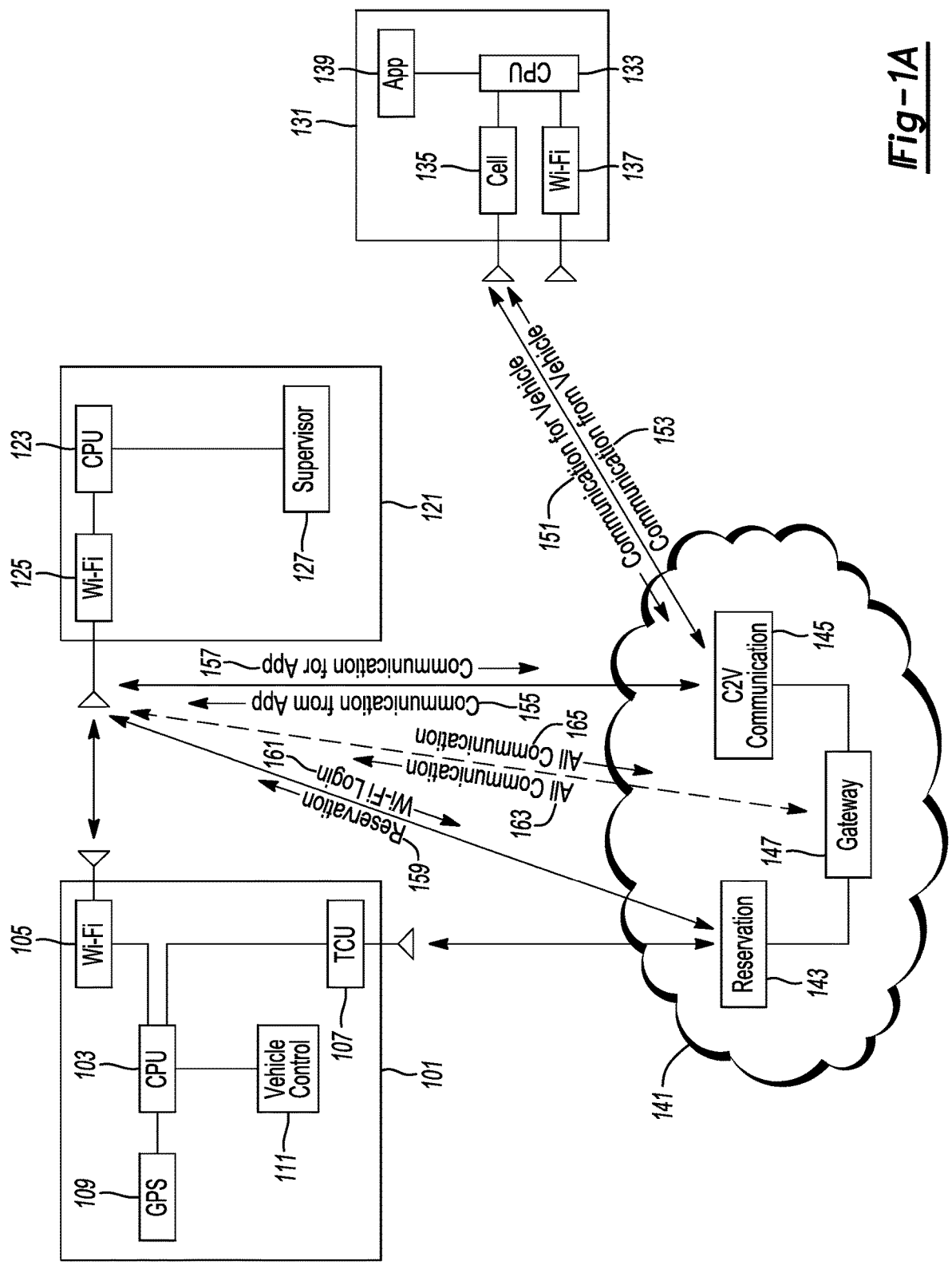
FIG. 1A shows an illustrative example of a vehicle parking system.

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

While connectivity may be lost when a vehicle enters a garage or travels within a garage, when a human is present, the human can simply take control of the vehicle if an autonomous or semi-autonomous system ceases to work, but when a vehicle is, for example, expected to self-park and/or return to an owner responsive to a summons, a lack of connectivity can prevent this from happening. While installing cellular repeaters could help maintain connectivity, this can be a highly expensive process as there are millions of such repeaters that would need to be installed to preserve connectivity in every parking structure in a single large country, and different repeaters may be needed for every cellular provider.

Moreover, when vehicles are engaged in self-parking, especially if assisted by a remote control program, those vehicles may benefit from coordinating with each other and the cloud. If those vehicles lose connectivity, they become reliant on onboard sensors and computing to make navigation decisions, which may help avoid accidents, but can create issues in parking garages where space is at a premium and coordinated efforts tend to mitigate gridlock.

The illustrative embodiments present example solutions for connectivity issues, coordination issues, and wake and summon issues that all may stem from a general signal loss when a vehicle enters a parking structure. These examples and the like improve the ability of a vehicle to self-park or self-park with computer assistance by maintaining connectivity and coordination between various self-driving or semi-self-driving vehicles.

In these examples, a garage is provided with a localized network (e.g., a Wi-Fi network whose coverage spans the garage interior) that vehicles within the garage can connect to. Credentials for connection can be provided in a number of manners as described herein. As a non-limiting example, a user may seek to reserve a space within a garage, and responsively be provided with credentials to connect to that garage's network when the reservation is confirmed. Then, when a vehicle with such credentials is within range of the network, the vehicle can connect to the network, which itself is connected to a wide area network (e.g., the Internet), preserving the ability of the vehicle to speak with other remote resources that also have access to the wide area network. This can both preserve connectivity to the vehicle (from a phone, for example) and can preserve the vehicle's ability to access remote resources and function at high capacity.

Also, in some examples, the garage itself will provide a vehicle supervisor responsible for managing the travel of vehicles within the garage. Because a garage may be subject to highly localized events that may not show up on a common digital map (e.g., construction, temporary blockages, etc), and because the garage itself represents a tight-spaced, often single lane, traffic network, in some instances where the pathing data and blockage data is not widely available it can be useful to have garage-interior navigation controlled by a system that is up to date with all the information pertinent to pathing within the garage vehicle network. The supervisor can, for example, segment vehicle pathing for multiple vehicles entering and exiting the garage, into micro tasks (short trips and commands), allowing for coordinated movement and smooth flow of vehicles into and out of the garage.

FIG. 1A shows an illustrative example of a vehicle parking system. In this example, a vehicle 101 includes an onboard processor 103 and remote communication capability, which can include, for example, a Wi-Fi transceiver 105 a telematics control unit (TCU) 107. The Wi-Fi transceiver 105 can connect to available Wi-Fi networks when the vehicle 101 has appropriate credentials for a given network, and the TCU 107 can provide cellular communication through a vehicle modem or an onboard portable device (e.g., a smartphone). Any other reasonable wireless connection capability may also be included in a vehicle 101, providing a wide array of connectivity options.

Also, in this example, the vehicle 101 includes an onboard global positioning system (GPS) 109 and a vehicle control process 111. The vehicle control process 111 and other such executable applications can be stored in one or more onboard memories, which can include memory allocated to the processor 103 and/or memories allocated to various other vehicle hardware units such as electronic control units (ECU)s. In this example, the vehicle control process can be used to control the vehicle 101 without a driver through execution of commands onboard the vehicle 101. These commands can come from onboard systems and processes and/or from remote processes such as the supervisor 127 and/or a cloud-based control system.

In this example, as previously noted, a garage 121 is provided with a Wi-Fi network 125 covering suitable areas of the garage 121. Each garage may have an onboard computer or server with a central processing unit 123 responsible for executing a supervisor process 127, or a supervisor process may be provided remotely but include configuration and pathing data for a given garage over which the process 127 has control. In one example, the supervisor process 127 has control rights for a plurality of, if not all, vehicles 101 within a given garage, allowing the supervisor process 127 to exert coordinated control over those vehicles 101 to smoothly flow traffic within the garage 121.

A user or owner of a given vehicle 101 may also have a personal, portable device 131, such as, for example, a cellular phone. These devices 131 may include onboard processing 133 as well as cellular 125 and Wi-Fi 137 transceivers. When in proximity to a vehicle 101, the Wi-Fi connection 137, for example, can be used to connect the device 131 directly to the vehicle 101 (as could other communication mediums). When both the vehicle 101 and the device 131 have a cellular connection active, the two can communicate through the active cellular connections. When a vehicle 101 is parked without access to a cellular signal, however, and when a user with the device 131 is outside the range of a garage network 125, there is limited opportunity for communication between the device 131 and the vehicle 101. Since the device 131 may be used to check various vehicle systems, as well as to eventually summon the vehicle 101 for drive-away through an onboard device application 139, the user would prefer that the device 131 have some way to contact the vehicle 101.

In this example, once a vehicle 101 has connected to the garage Wi-Fi network 125, an original equipment manufacturer (OEM) server 145 responsible for device to vehicle communication, and existing in the cloud 141, can connect to the Wi-Fi network 125 as well and use the Wi-Fi network 125 for communication between the device 131 and the vehicle 101. So, for example, if an application 139 sends communication 151 intended for the vehicle 101 to the cloud communication server 145, the server 145 can relay that communication 155 to the garage Wi-Fi network 125, where the communication can be delivered to the relevant vehicle 101. In a similar manner, a response 157 from the vehicle 101 can be received by the communication server 145 and the server can send the response 153 back to the device 131 and/or application 139 on the device 131.

The vehicle 101 and the cloud 141 can obtain credentials for the given garage network 125 through a reservation process 143. In some examples, garage owners may treat OEMs as trusted entities and provide credentials to those OEMs when a garage network 125 is established. In other instances, the vehicle 101 can request a reservation of a space within a garage 121 through the reservation process 143. The reservation request 159 is sent to the garage 121 and if confirmed, the garage 121 may respond with connection credentials 161. If the reservation server does not have direct access to the Wi-Fi network 125 prior to such a request, the request for reservation may be handled through a process accessible without having network credentials for the garage (e.g., a local process or alternative cloud-based process that can provide the connection credentials responsive to reservation). The reservation process 143 can send the connection credentials back to the vehicle 101 for use by the vehicle 101 when the vehicle 101 arrives at the garage 121.

In some examples, the cloud 141 may also include a communication gateway process 147 responsible for all communication with vehicles 101. In such a case, communication from the communication to vehicle process 145 and/or the reservation process 143 (and any other relevant communication to or from the vehicle 101) can be passed through the gateway process 147. In these instances, the gateway process may be responsible for sending and receiving (and distributing) all communication to 163 and from 165 the vehicle 101. Such a process (the gateway 147 and/or the communication process 143) could also summon the vehicle 101 responsive to a request from an OEM, if, for example, a user's device 131 died and the user was unable to request that the vehicle 101 exit the garage 121.

Figure 1B:
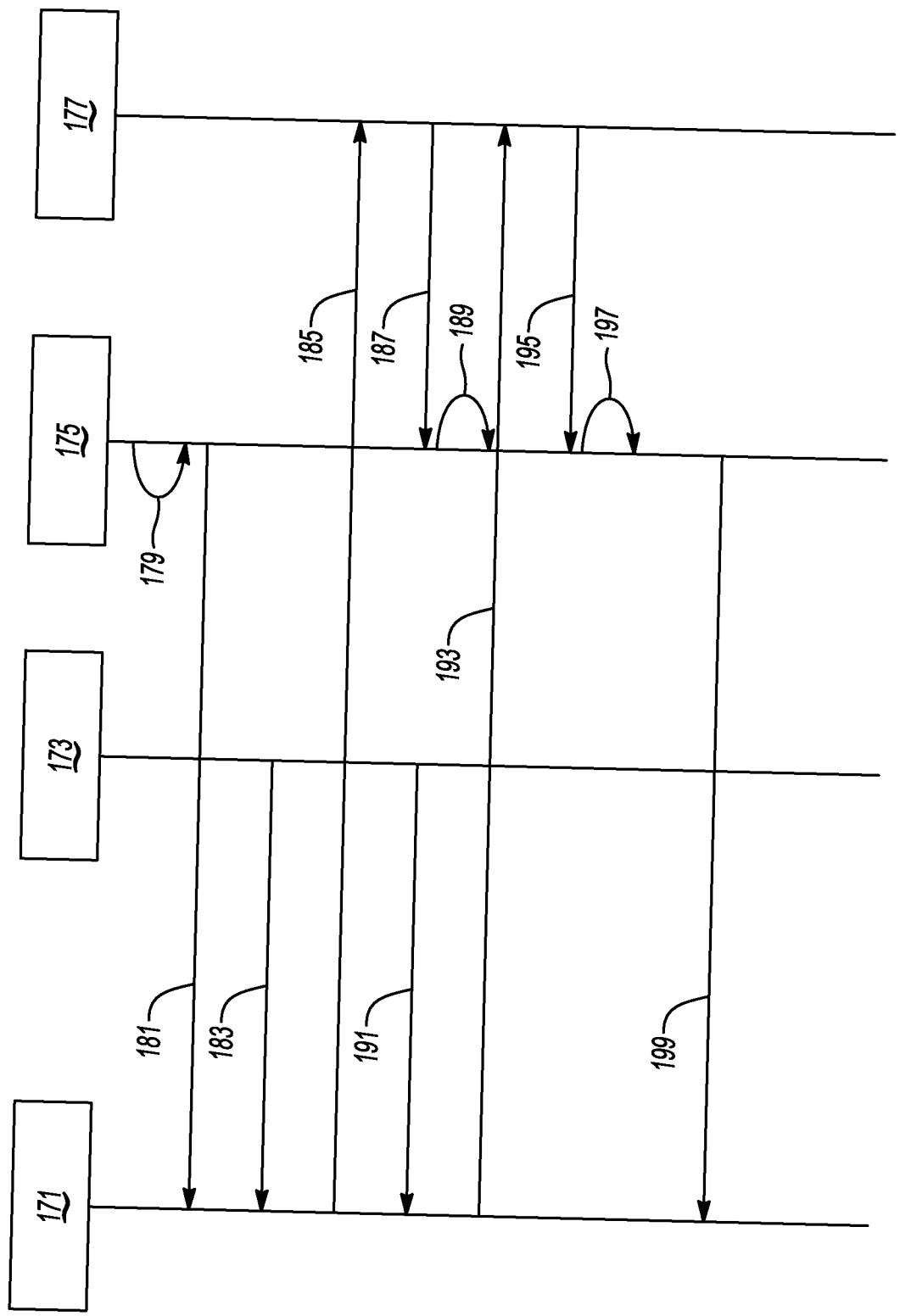
FIG. 1B shows an illustrative example of a process for vehicle parking and control/communications transfer.

FIG. 1B shows an illustrative example of a process for vehicle parking and control/communications transfer. There are four illustrative participants in this process, the OEM backend (or other backend process/server) 171, a customer 173, a vehicle 175 and a parking structure 177. While numbered separately in this figure, these elements are illustrative examples of the servers/vehicles/parking garages discussed with respect to FIG. 1A.

In this example, after obtaining credentials and arriving within range of a Wi-Fi network 125 provided to a parking garage 177, the vehicle 175 connects 179 to the Wi-Fi network 125 in anticipation of parking. The vehicle 175 notifies 181 the OEM backend 171 to use the Wi-Fi connection, not a cellular connection, for further communication while the vehicle 175 is in the garage 177. The customer 173 then requests 183 (the vehicle 175 in this example having autonomous control capability) that the vehicle 175 be parked, and that request is sent to the OEM backend 171. The OEM backend 171 sends 185 the parking request to the parking structure 177, where a supervisor 127 process will park the vehicle 175.

The supervisor process 127 determines where the vehicle 175 will be parked and then segments 187 the travel of the vehicle 175 into a series of micro-tasks. Those can be, for example, without limitation, travel 100 feet straight, wait 30 seconds, turn right, travel 50 feet straight, etc. By moving vehicles 175 around like chess pieces within the structure, the supervisor process ensures continuity of flow and avoids having two vehicles 175 attempt to occupy the same location at the same time.

After completing some number of micro-tasks, the vehicle 175 eventually parks 189. At this point, the vehicle 175 can go into a sleep mode, awaiting a recall instruction from the user 173. If the vehicle 175 needs to be moved to a different space for some reason, the parking garage 177 supervisor process 127 can wake the vehicle 175 as well, and enact the micro-tasks necessary to move the vehicle 175 to the new location.

At some point after the vehicle 175 parks, a user 173 will want to use the vehicle 175 again, and can issue 191 a vehicle summon request. Since the user's personal device (e.g., phone, tablet, watch, etc.) cannot always rely on direct communication with the vehicle 175, due to possible signal loss, the request 191 can pass to the OEM backend 171. The OEM backend 171 is connected to the parking garage network 125, and the backend 171 passes 193 the summon vehicle request to the parking structure 177 supervisor process 127. The supervisor process 127 can then formulate 195 the micro-tasks needed to get the vehicle 175 to the exit, and pass those tasks to the vehicle 175. Following execution of those tasks, the vehicle 175 arrives 197 at the exit.

The user 173 can then enter 199 the vehicle 175 and at this point the vehicle 175 can verify occupancy to the OEM backend 171 via a cellular connection that has been re-established. This signals to the OEM backend 171 that the vehicle 175 is now reconnected to the cellular network, and the OEM backend 171 can use the cellular network to communicate with the vehicle 175 and disconnect from the parking garage 177 Wi-Fi network 125.

Figure 2:
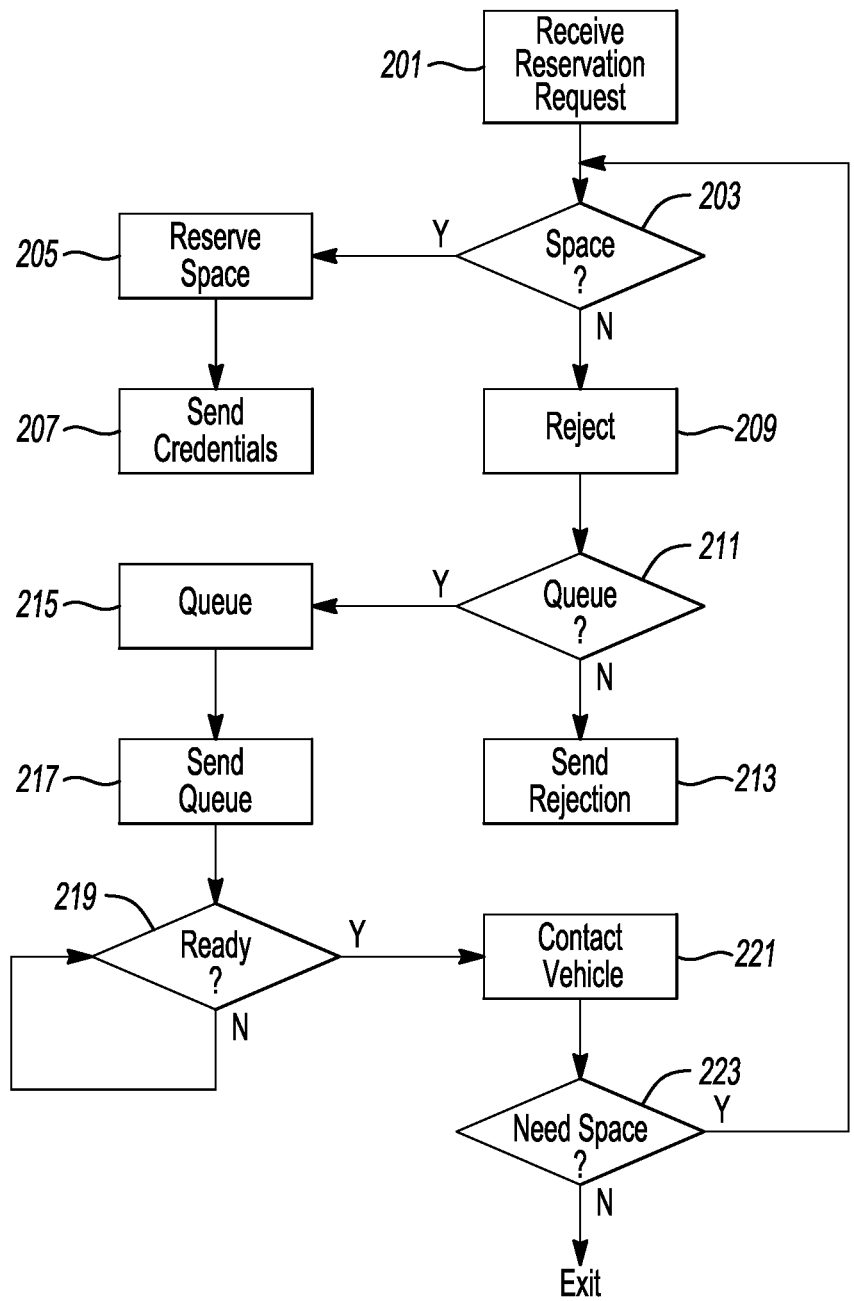
FIG. 2 shows an illustrative reservation process.

FIG. 2 shows an illustrative reservation process executable by, for example, a garage-affiliated processor 123. In this example, the vehicle 101 will be requesting a reservation from a parking garage 121 for a space in advance of arrival. While the vehicle 101 could simply arrive at the garage without a reservation, and obtain the connection credentials at that point in time, reservation processes can ease the burden on the parking supervisor process 127, which can plan for arrivals, as well as speed along the onboarding process when the vehicle 101 wants to connect to the garage network 125, because the vehicle 101 can receive the connection credentials in advance of arrival.

In this example, the supervisor process 127 or other garage process receives a reservation request from the vehicle 101 or the cloud 141 at 201. If there is an available space for reservation at 203, the garage 121 can reserve the space for the requesting vehicle at 205 and respond with the connection credentials at 207 for the vehicle 101 and OEM backend 141 to both connect to the garage network 125 at the appropriate time. That will complete the reservation process in this simple example, when a space is available.

If there is presently no space at 203, the garage 121 will initially reject the request at 209, but may also have a queuing option at 211. Since the vehicle 101 presumably has some travel time remaining before the vehicle 101 arrives at the garage 121, the garage 121 may temporarily queue the request until, for example, the vehicle 101 books a different reservation, arrives at the garage and the garage 121 remains full, and/or a space becomes available. If there is no queuing option at 211, or if the queue is full, the garage 121 may reject the request at 213.

If there is a queuing option at 211, the garage 121 can queue the request for reservation at 215. The garage 121 may also send a queue notification at 217, which can include, for example, expected wait times, likelihood of obtaining a reservation, position in queue, etc. In some instances, the vehicle 101 may notify the garage 121 if the vehicle 101 obtains another reservation, but in this example the garage 121 simply waits until there is a space at 219, and then contacts the vehicle 101 at 221 to see if the vehicle 101 still needs the reservation at 223. If the vehicle 101 need has passed, the garage 121 can simply dequeue the vehicle 101 and move to a next-queued vehicle 101. Otherwise, the garage 121 can complete the reservation process with the vehicle 101 now having a reserved space.

Figure 3:
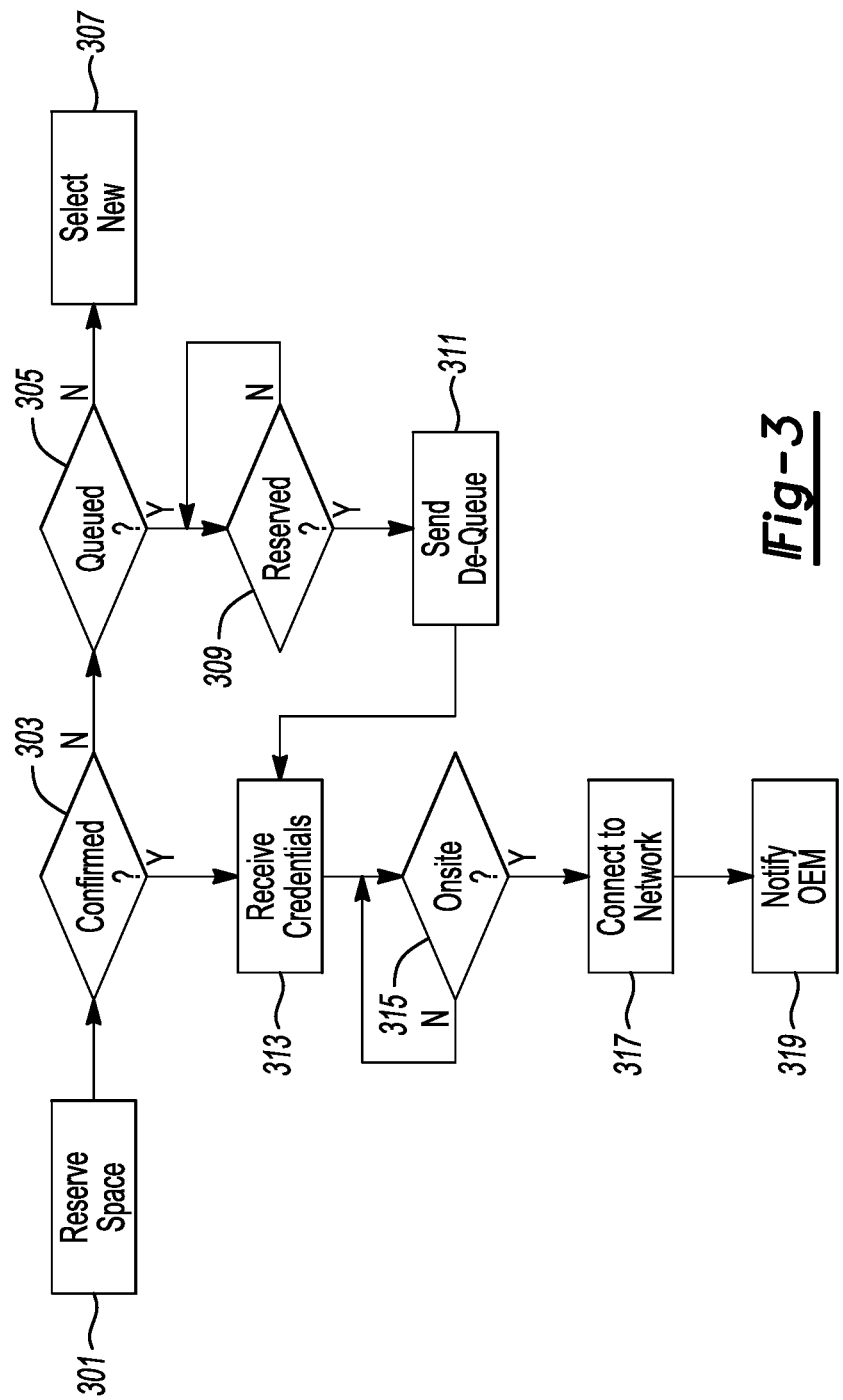
FIG. 3 shows an illustrative network connection process.

FIG. 3 shows an illustrative network connection process executable by, for example, a vehicle 101 processor 103. In this example, the vehicle 101 sends a reservation request at 301. This request could have been input via an in-vehicle input, automatically requested by the vehicle 101 based on a destination, input into a mobile device 131, etc.

If the request is denied at 303, at least temporarily, the vehicle 101 may determine if the request is queued at 305. If the request is not even queued by the garage 121, the vehicle 101 (or other requesting entity) may send a new request at 307 to a different garage. Selection of the different garage 121 can also be automatic based on proximity to a request garage 121 or destination, for example, or can be user-specified.

If the request is queued at 305, then the vehicle 101 can elect to wait at 309 until a reservation occurs. The vehicle 101 can still send additional requests to other garages 121 while it waits, and if and when any particular request is filled at 309 or at 303, the vehicle 101 can send a dequeuing request 311 to the various queues in which the vehicle 101 may be waiting for reservation.

At this point, or if the request was initially confirmed at 303, the vehicle receives connection credentials at 313 for connecting to the garage 121 Wi-Fi 125. This can include, for example, network identifiers, security credentials, and any other information usable or useful in accessing a particular Wi-Fi network 125.

At some point in travel, the vehicle 101 arrives within communication range of the garage network 125. Once the vehicle 101 is onsite at 315 (based on location, detecting the network 125, an indicator from a remote source, etc), the vehicle 101 can connect to the Wi-Fi network 125 at 317, using the credentials provided during the reservation. As noted above, the vehicle 101 can also obtain these credentials upon arrival, even if no reservation is made, which can also include a user viewing the credentials from a posted sign in the garage and simply inputting them into a vehicle 101 input or mobile device 131 input.

The vehicle 101 then notifies the OEM backend 171 at 319 that the vehicle 101 is connected to the Wi-Fi network 125. This can result in the OEM backend 171 electing to use the Wi-Fi network for communication with the vehicle 101 until such time as the vehicle 101 confirms that it has reconnected to the cellular network. The OEM backend 171 may already have the credentials needed to use the network from the reservation process, or the vehicle 101 can pass the necessary credentials when notifying the OEM backend 171 of the now-established connection to the Wi-Fi network 125.

Figure 4:
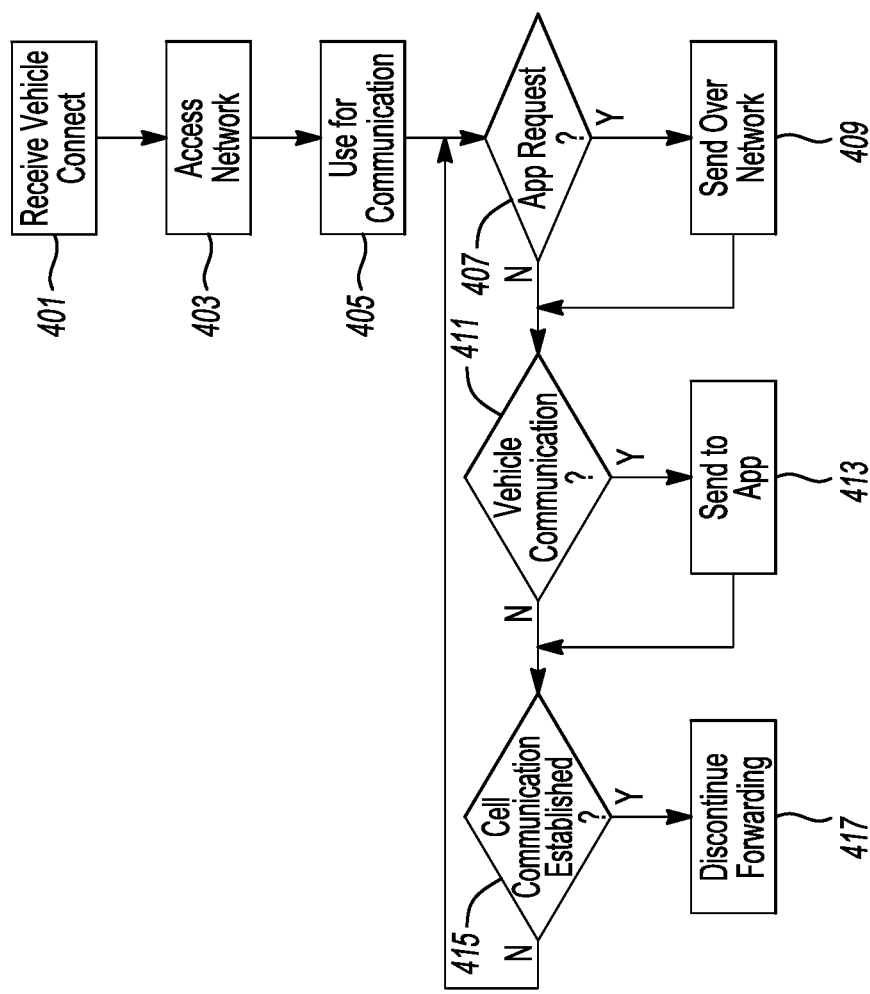
FIG. 4 shows an illustrative vehicle communication process.

FIG. 4 shows an illustrative vehicle communication process executable by, for example, a backend connection process 145. In this example, the backend 145 receives a notification from the vehicle 101 when the vehicle 101 connects to the Wi-Fi network 125. The vehicle 101 may be disconnected from a cellular network, in this example, so the mobile device 131 may not be able to use the cellular network for vehicle communication. But, in this example, the vehicle 101 is connected to Wi-Fi network 125, and the backend 145 is also able to connect to the Wi-Fi network 125 over the Internet, for example.

Responsive to receiving the notification from the vehicle 101 at 401, the backend 145 accesses the Wi-Fi network 125 at 403. Until the vehicle 101 notifies the backend 145 that the vehicle 101 has re-established a connection to the cellular network, the backend 145 uses the Wi-Fi network for vehicle communication at 405. While the backend 145 is connected to the Wi-Fi network 125, the backend may receive a number of requests for communication for the vehicle 101, e.g., from the mobile device 131, and/or requests for communication from the vehicle 101, e.g., for the mobile device 131.

If the backend receives a request from a mobile device application 139 at 407, it will send the request to the vehicle at 409, over the Wi-Fi network 125. Or, for example, if the backend 145 receives vehicle communication at 411, it will send that communication to the mobile device application 139 at 413. Even though the backend 145 is connected to the Wi-Fi network 125, it can also communicate with the mobile device 131 over a cellular connection, and thus communication with the vehicle 101 can be maintained through the backend 145. The communication relay continues until the backend 145 receives a notification that the vehicle 101 has re-established communication with the cellular network at 415. At that point, the backend 145 can discontinue forwarding at 417, because the mobile device 131 and vehicle 101 can now communicate through the cellular network to which both are now connected.

Figure 5:
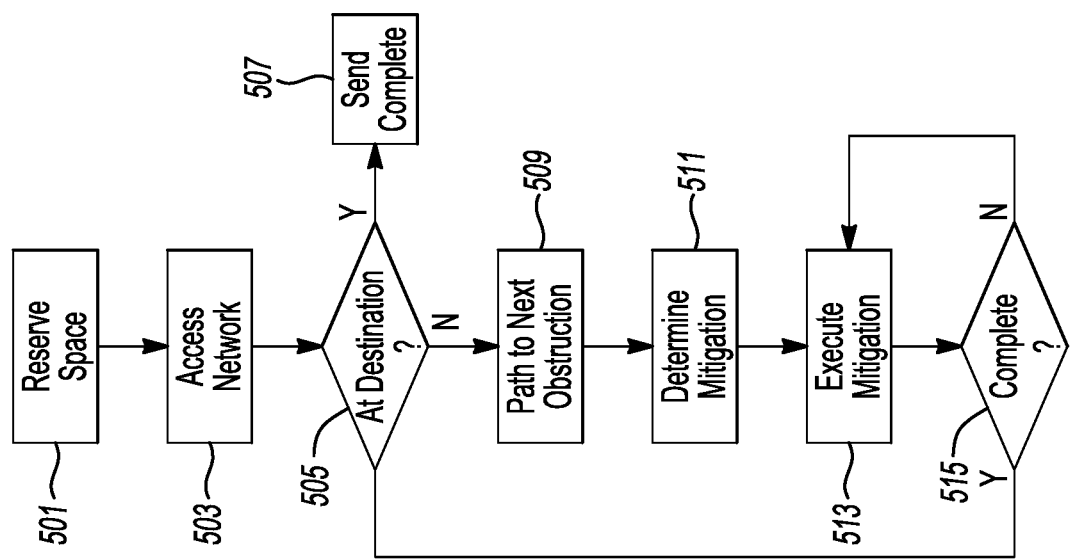
FIG. 5 shows an illustrative supervisor process.

FIG. 5 shows an illustrative supervisor process 127 executable by, for example, a processor 123 associated with a parking garage 121 in which a vehicle 101 is going to be parked. This is a simplified version of what could be a highly complex process, but it demonstrates how a supervisor program with the ability to control a plurality of vehicles 101 can efficiently manage the parking of multiple vehicles 101 within the confined spaces of the garage 121.

In this example, the supervisor 127 begins determining pathing for a given vehicle 101 at 501. The supervisor 127 also knows the pathing plans for all other mobile vehicles within the garage, in this example, so a plan for each vehicle 101 can be made while accommodating the travel plans of the other vehicles in the garage, which are also controlled by the supervisor 127. While it is possible to only control a subset of vehicles with the supervisor 127, and have some vehicles 101 self-direct or be driven by humans, it is contemplated that if the supervisor can control the maximum number of vehicles 101 this will likely be a more efficient way of parking. Nonetheless, if certain users do not want to turn control over to the supervisor 127, the supervisor can receive feedback from, for example, garage cameras, sensors, vehicle cameras, sensors, etc., and accommodate the unplanned movement of vehicles 101 not controlled by the supervisor 127.

In this example, the supervisor 127 determines a destination for a given vehicle 101 at 503. This is a destination within the garage 121, such as a parking space in which the vehicle 101 will eventually be parked. If there is only one vehicle 101 moving in the garage 121 at a given time, the supervisor can simply instruct the vehicle 101 to proceed on a complete path to the parking space. But typically vehicles 101 will be going in and out of the garage 121, as well as multiple vehicles trying to park at one time. When the vehicle 101 does eventually reach the destination at 505, the supervisor 127 can send a message at 507 to a user (e.g., via the backend 145), that parking is complete.

Until the destination is reached by the vehicle 101, the supervisor 127 segments the route into a series of paths. In this example, the paths are tasks before the vehicle 101 encounters an obstruction or point of change. Accordingly, in this example, the supervisor 127 determines a first action for the vehicle 101 such as, for example, travel forward 100 feet at 509. After 100 feet, the vehicle 101 may encounter an obstruction, be forced to wait, etc., and thus a micro-task is achieved in the partial travel of the route to the parking space.

Next, in this example, since an obstacle is encountered or a wait is required, the supervisor determines a mitigation at 511. Mitigation can be as simple as waiting for another vehicle 101 to complete a micro-task, or can involve instructing another vehicle to move or complete a micro-task to clear the obstruction to the object vehicle 101. Once the mitigation is executed at 513 (e.g., the object vehicle waits, another vehicle moves, etc.), the supervisor determines if the mitigation is complete at 515 or if other mitigations may need to be completed. Once all mitigation is completed, the supervisor determines if the object vehicle 101 is at the destination and, if not, the micro-task process can proceed with a next-task until a next-obstruction. This continues until the vehicle 101 reaches the destination.

Figure 6:
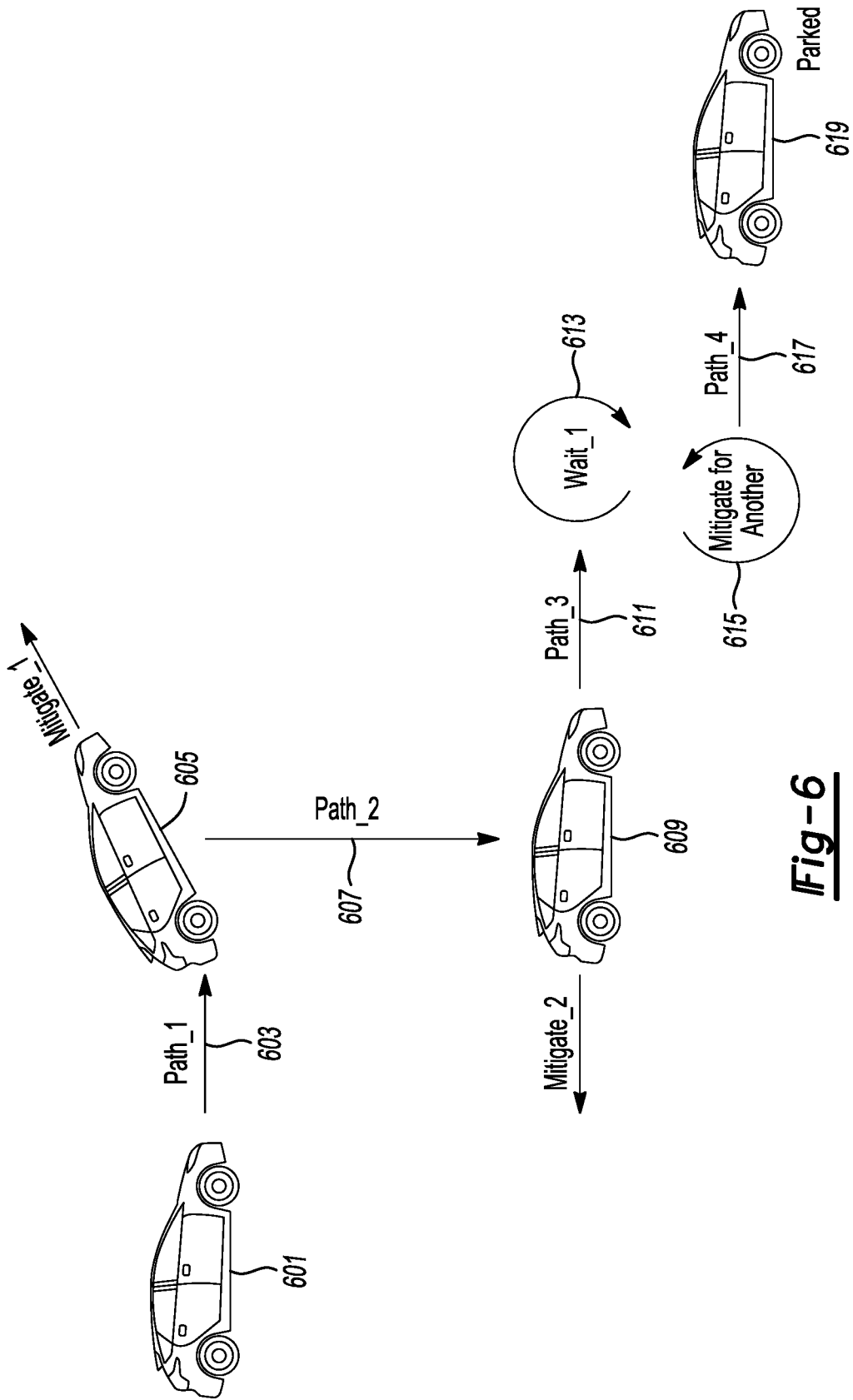
FIG. 6 shows an illustrative path and command process for a vehicle engaged in micro-tasks.

FIG. 6 shows an illustrative path and command process for a vehicle engaged in micro-tasks. This is an example of vehicle 601 movement and instructions, as well as including two other vehicles 605 and 609, and shows how the supervisor 127 can manage the movement of multiple vehicles through a parking garage 121.

Here, the object vehicle 601 begins by moving down path_1 603, which is the first micro-task for that vehicle 601. At this point, the vehicle 601 encounters vehicle 605, which is also traveling to or from a destination parking space. Since the path of 601 is blocked by 605, the supervisor instructs migration by allowing or instructing vehicle 605 to complete its own next micro-task, mitigating the obstacle to vehicle 601.

Now that the path is clear, vehicle 601 proceeds with a second micro-task, traveling down path_2 607. This travel continues until the vehicle 601 encounters vehicle 609, which again is traveling its own path of micro-tasks. Since vehicle 609 is an obstacle to vehicle 601, vehicle 601 waits while vehicle 609 completes its next micro-task, clearing the obstacle to vehicle 601, which then continues down path_3 611 as the next micro-task.

At this point, vehicle 601 may need to wait for a parking space to free up at 613. By having a supervisor program 127, it is actually possible to use more space in the garage 121 than is represented by parking spaces, as long as sufficient maneuvering room remains, since the supervisor 127 can leave vehicles in lanes until spaces free up, and move those vehicles 601 as needed. When a vehicle (not shown) leaves the parking space intended for 601, for example, the vehicle leaving may encounter 601 on the path out. In this instance, since the two vehicles need to pass each other, the vehicle 601 may perform a mitigation micro-task by moving out of the way of the leaving vehicle at 615. Then vehicle 601 can complete path_4 617 and arrive at the parking space 619.

While micro-tasks have been described as tasks and mitigations, it is really just a matter of perspective, one vehicle's task is mitigation of an obstacle for another vehicle. The system allows a large scale division of micro-tasks to efficiently move vehicles and clear obstacles and keep traffic flowing in and out of the garage 121. As noted, this can actually use more space in the garage than parking spaces, as long as maneuvering room remains, and many micro tasks can execute simultaneously across multiple vehicles to keep the whole network of vehicles moving into and out of the garage and mitigating obstacles as needed.

Programming instructions for executing illustrative embodiments and the like may be executed by suitable processors, including, but not limited to, vehicle processors, cloud processing and/or mobile device processors, depending on the variation of the examples. Non-transitory storage media, such as, but not limited to, hard disk drives, solid state drives and other storage media used to store programming instructions, may store instructions allowing processors accessing that storage media to execute the instructions to perform the illustrative embodiments and the like.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
 a processor configured to:
 communicate with a plurality of vehicles capable of self-driving onsite at a parking garage;
 determine an eventual intended destination for each respective vehicle of the plurality of vehicles;
 determine a path through the garage for each respective vehicle, to the destination for the respective vehicle;
 segment the path into a plurality of shorter tasks for each respective vehicle, wherein each task moves each respective vehicle along the path for the respective vehicle until a point where the respective vehicle is projected to encounters an obstruction created by another of the plurality of vehicles based on the path determined for the another vehicle;
 determine a mitigation task assigned to the respective vehicle encountering the obstruction, for each projected encounter of obstruction, the mitigation task accommodating allowing the another vehicle to move along the path determined for the another vehicle prior to the respective vehicle continuing progress towards the destination;
 for each vehicle of the plurality of vehicles, assemble a series of self-driving tasks including the shorter tasks and the mitigation tasks identified for each vehicle;
 transmit the series of self-driving tasks to the vehicles for which the self-driving tasks were respectively assembled and
 instruct each receiving vehicle to execute the series of self-driving tasks transmitted to the receiving vehicle.

2. The system of claim 1, wherein the intended destination includes a garage exit.

3. The system of claim 1, wherein the intended destination includes a parking space.

4. The system of claim 1, wherein the intended destination includes a waiting location within the garage, other than a parking space.

5. The system of claim 4, wherein the processor is configured to determine the waiting location responsive to the processor determining that no parking space is presently available for use by a given vehicle.

\* \* \* \* \*